United States Patent
Dong

(10) Patent No.: US 6,747,869 B2
(45) Date of Patent: Jun. 8, 2004

(54) MICROCOMPUTER HEAT DISSIPATION SYSTEM

(76) Inventor: Guangji Dong, No. 12 Shuang Yue Lane Shuanghe Road, Heze City, 274000 Shandong (CN)

( * ) Notice: Subject to any disclaimer, the term of this patent is extended or adjusted under 35 U.S.C. 154(b) by 0 days.

(21) Appl. No.: 09/996,846

(22) Filed: Nov. 20, 2001

(65) Prior Publication Data

US 2002/0122297 A1 Sep. 5, 2002

Related U.S. Application Data

(63) Continuation of application No. PCT/CN00/00061, filed on Mar. 24, 2000.

(30) Foreign Application Priority Data

Jun. 2, 1999  (CN) ........................................ 99212818 U
Nov. 1, 1999  (CN) ........................................ 99123220 A

(51) Int. Cl.[7] ................................................ G06F 1/20
(52) U.S. Cl. ..................... 361/687; 361/687; 165/80.4; 174/15.2; 62/3.2; 62/3.3
(58) Field of Search ............................... 361/687–723, 361/748, 760, 761, 773, 774, 776, 779, 785, 789

(56) References Cited

U.S. PATENT DOCUMENTS 5,731,954 A * 3/1998 Cheon ......................... 361/699
6,333,849 B1 * 12/2001 Donahoe et al. ............ 361/687

FOREIGN PATENT DOCUMENTS

| CN | 2266731 Y | 11/1997 |
| JP | 06-260783 | 9/1994 |
| JP | 10-213370 | 8/1998 |

* cited by examiner

Primary Examiner—Darren Schuberg
Assistant Examiner—Yean-Hsi Chang
(74) Attorney, Agent, or Firm—Law Office of Marc D. Machtinger, Ltd.

(57) ABSTRACT

A microcomputer heat dissipation system comprising heat-absorbing units, wherein said heat-absorbing units can be bonded to heat-generating electrical components inside the microcomputer and are in communication with a fluid circulating unit, and, to said fluid-circulating unit, there can be serially connected at least a heat-radiating pipe bondable to a heat-radiating plate, with said heat-radiating plate disposed on the outer wall surface of the chassis. In this manner, most of the heat generated by the microcomputer is dissipated to the space outside of the microcomputer, and, at the same time, the elimination of the internal fans of the microcomputer permits a considerable reduction in the acoustic noise level during operation of the microcomputer.

33 Claims, 7 Drawing Sheets

MICROCOMPUTER HEAT DISSIPATION SYSTEM

CROSS-REFERENCE TO RELATED APPLICATIONS

This application is a continuation of International Application No. PCT/CN00/00061, filed Mar. 24, 2000, which is hereby incorporated by reference in its entirety.

TECHNICAL FIELD

The present invention is concerned with a microcomputer heat dissipation system, in particular, with a heat dissipation system capable of effecting heat dissipation from a microcomputer while reducing acoustic noise produced by the microcomputer.

BACKGROUND OF THE INVENTION

At present, publicly known microcomputer heat dissipation systems are made up of a CPU fan and a power supply fan, with the high-speed rotation of the two fans creating acoustic noise levels as high as 55 db, which constitutes a type of pollution of the working environment for professional computer operators. Over time, continuous operation of a microcomputer leads to wear and tear on fan components, which aggravates the acoustic noise problem. In addition, such fan-based heat dissipation systems simply cause heat to be dispersed throughout the microcomputer, and are incapable of directly dissipating said heat to the outside of the chassis.

SUMMARY OF THE INVENTION

It is an object of the present invention to provide a microcomputer heat dissipation system capable not only of efficiently dissipating heat generated during operation of a microcomputer, but also capable of lowering the acoustic noise level of the microcomputer to 15 db or less, ensuring quietness in microcomputer operation.

The object of the present invention is attained as follows. A type of microcomputer heat dissipation system comprising a circulation-based heat dissipation system disposed inside a microcomputer chassis, which is characterized by utilizing a plurality of heat-absorbing units that can be disposed on heat-generating electrical components inside the microcomputer, and by the fact that said heat-absorbing units, via appropriate connection of pipework in series or in parallel, are in communication with a fluid circulating unit, and, to said fluid-circulating unit, there can be serially connected at least a heat-radiating pipe bondable to a heat-radiating plate, with said heat-radiating plate disposed on the outer wall surface of the chassis.

A type of microcomputer heat dissipation system comprising a power supply heat dissipation system and a circulation-based heat dissipation system inside a microcomputer chassis, which is characterized in that the above-mentioned circulation-based heat dissipation system employs a plurality of heat-absorbing units that can be disposed on heat-generating electrical components inside the microcomputer, and in the said heat-absorbing units, via appropriate connection of pipework in series or in parallel, are in communication with a fluid circulating unit, and, to said fluid circulating unit, there can be serially connected at least a heat-radiating pipe bondable to a heat-radiating plate, with said heat-radiating plate disposed on the outer wall surface of the chassis. In the above-mentioned power supply heat dissipation system, the high-power transistors of the microcomputer power supply unit are connected to the heat-radiating plate via a heat-conducting device such as a metal heat transfer plate by means of planar contact, with said heat-radiating plate disposed on the outer wall surface of the chassis.

The above-described configuration allows for most of the heat generated by the microcomputer to be dissipated from the heat-radiating plate directly to the space outside of the microcomputer and, at the same time, eliminates internal fans in the microcomputer and ensures quietness in operation.

Other features and advantages of the invention will be apparent from the following detailed description taken in conjunction with the following drawings.

DETAILED DESCRIPTION OF THE PREFERRED EMBODIMENT

Figure 2:
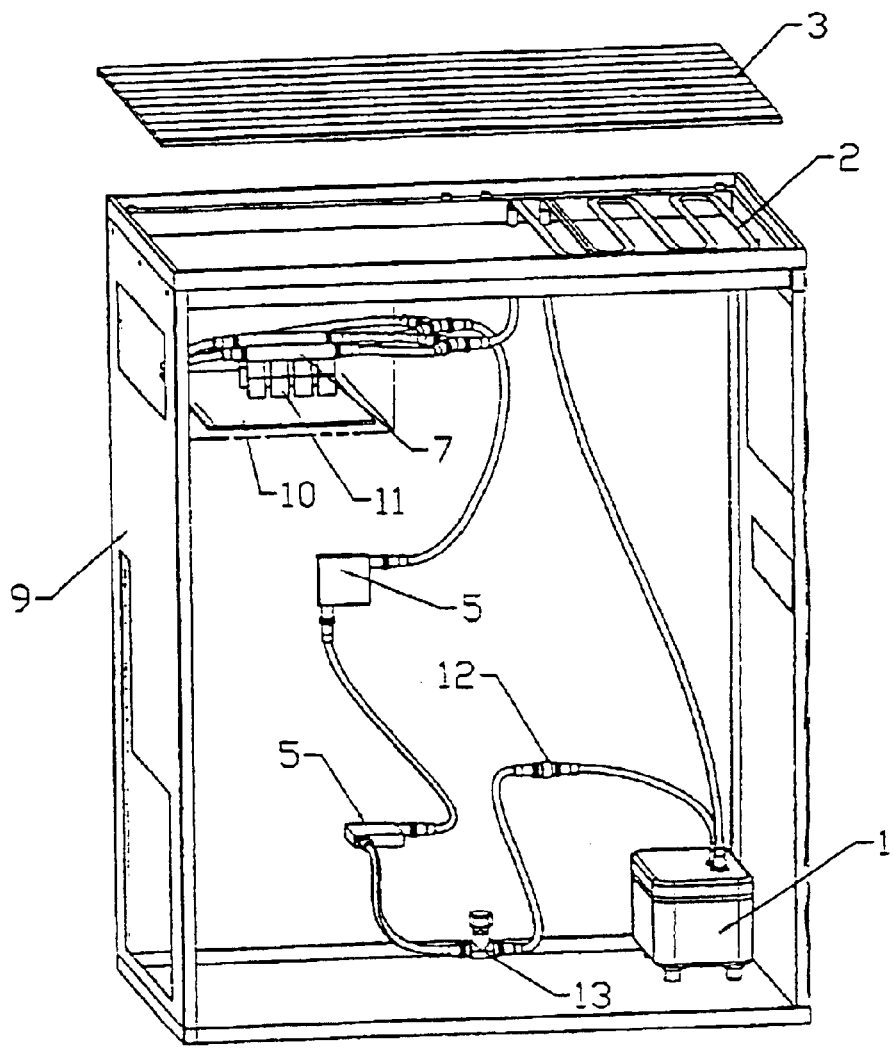
FIG. 2 is a structural drawing of Application Example 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Application Example 1

Figure 1:
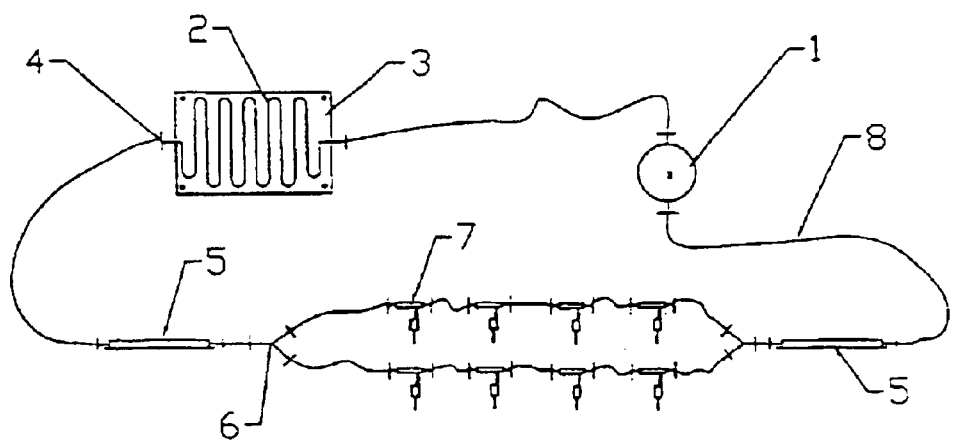
FIG. 1 is a schematic drawing of a circulation-based heat dissipation system.

As shown in the schematic diagram of FIG. 1, the circulation-based heat dissipation system of the present invention consists of heat-absorbing units (5, 7), a heat transfer pipe (2), a heat-radiating plate (3), a fluid feed pump (1), a pipe connector (4), a three-way pipe connector (6), and heat transfer fluid.

At the fluid inlet and outlet ends of the heat-absorbing units (5, 7), heat transfer pipe (2), and fluid feed pump (1), there are installed two pipe connectors (4), and their serial connection to heat transfer pipe (2) forms a closed fluid path. The heat transfer pipe (2) is a serpentine metal pipe bonded to the heat-radiating plate (3) and filled with a heat transfer fluid. The heat transfer fluid, set in motion by the fluid feed pump (1), transfers heat absorbed by the heat-absorbing units (5, 7), which are bonded to the surface of heat-generating components of the microcomputer, through the fluid feed pipe (8) via the metal heat transfer pipe (2) to the heat-radiating plate (3), from which the heat is dissipated to the surrounding air outside the microcomputer.

In the above-described circulation path, an arbitrary number of heat-absorbing units and heat transfer pipes can be serially connected in any given sequence to the fluid feed pump using pipe connectors, and any number of heat-absorbing units can be connected in series or in parallel in any given sequence using three-way connectors and pipe connectors.

FIG. 2 is a structural drawing of Application Example 1, wherein the external wall surface of a top panel located in the top portion of microcomputer chassis (9) has a recess used to receive a heat transfer pipe (2) and a heat-radiating plate (3), with the top surface of the heat transfer pipe (2) disposed in contact with the bottom surface of the heat-radiating plate (3). The heat-radiating plate (3) is integrally attached to the top panel in the top portion of the microcomputer chassis. The bottom face of the casing of a fluid-circulating pump (1) is integrally attached to the bottom face of the chassis through the medium of the shock-absorbing device. Heat-absorbing units (5) are integrally bonded to heat-generating components in the microcomputer, and heat-absorbing units (7) are integrally bonded to high-power transistors (19-2) on the power supply unit's printed circuit board (10). Made of metal, the heat-radiating plate (3) has a smooth flat face on one side and parallel ribs on the other side.

Figure 3:
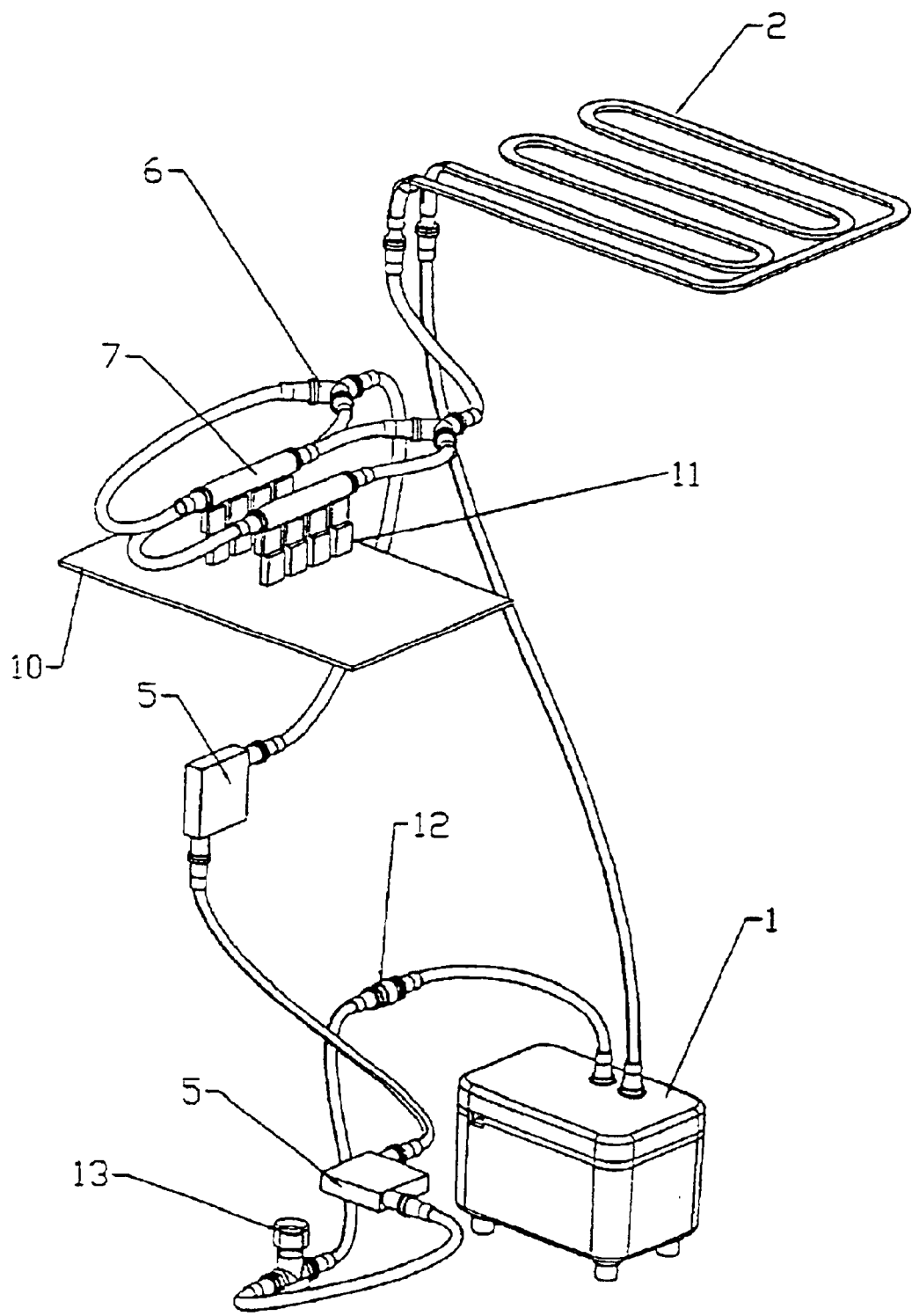
FIG. 3 is an enlarged structural drawing of the circulation system used in Application Example 1.

FIG. 3 is a an enlarged view of the circulation system used in Application Example 1, wherein one outlet of the fluid feed pump (1) is sequentially connected to a supply fluid connector (12), a pressure equilibration tube (13), heat-absorbing units (5), a three-way pipe connector (6), and heat-absorbing units (7), which are connected in parallel to the other two orifices of the three-way pipe connector, with said heat-absorbing units (7) connected to a heat transfer pipe (2) via a three-way pipe connector and the other end of the heat transfer pipe (2) connected to the other outlet of the fluid feed pump (1).

Figure 4:
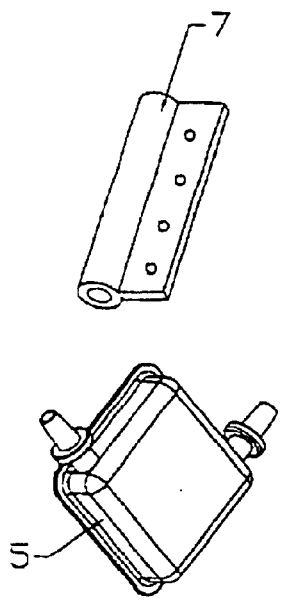
FIG. 4 is structural drawing of a heat-absorbing unit.

FIG. 4 represents the construction of the heat-absorbing unit (5), wherein two pipe connectors are disposed on the outer wall surface of a hollow cavity, in communication with the cavity, and said hollow cavity has at least one flat face, with said flat face used for bonding to heat-generating components inside the microcomputer. The construction of the heat-absorbing unit (7) can be described as a hollow cavity provided with two pipe connectors and having a heat-absorbing plate attached to the hollow cavity, with said heat-absorbing plate used for bonding to the heat-generating surfaces of the high-power transistors. Said heat-absorbing plate can be simultaneously bonded to a plurality of high-power transistors.

Figure 5:
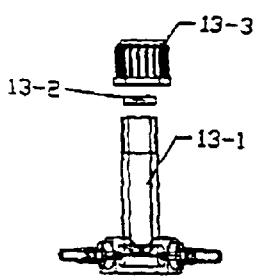
FIG. 5 is a structural drawing of a pressure equilibration tube.
Figure 5:
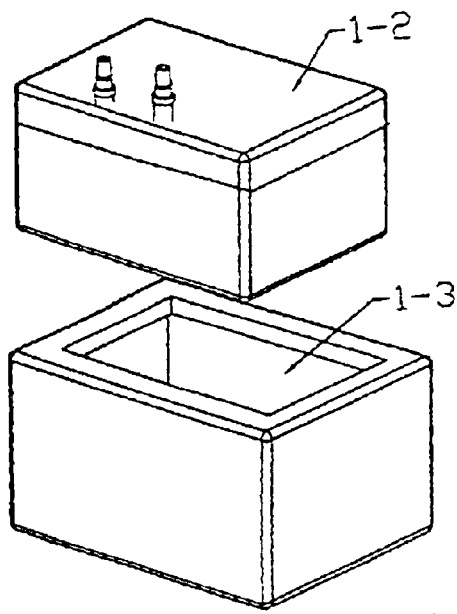

FIG. 5 illustrates the construction of the pressure equilibration tube (13), which is made up of a three-way pipe fitting (13-1) and two pipe connectors disposed on the three-way pipe fitting (13-1), with a matching thread for a cap (13-3) disposed around the periphery of the other end thereof and a sealing gasket (13-2) provided for sealing the end of the pipe.

Figure 6:
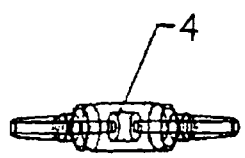
FIG. 6 is a structural drawing of a supply fluid tube connector.
Figure 6:
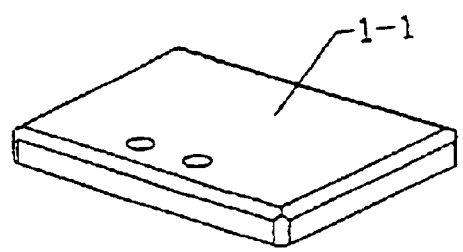
Figure 7:
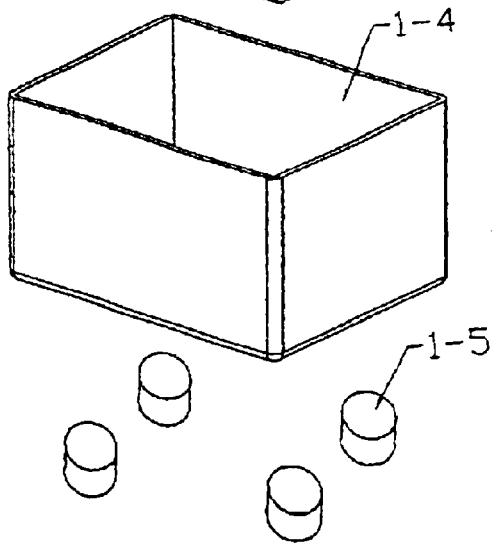
FIG. 7 is a structural drawing illustrating shock absorbing structure used for a fluid feed pump.

FIG. 6 illustrates the construction of the supply fluid connector, wherein the tube (14) is a tubular body, with two pipe connectors provided at both ends thereof FIG. 7 is a structural drawing of the shock-absorbing system of the fluid feed pump, wherein a pump main body (1-2) is combined with a lid (1—1) and an outer casing (1-4) though the medium of a shock-absorbing layer (1-3), with shock-absorbing feet (1-5) mounted on the bottom face of the outer casing (1-4) and integrally attached to the inner bottom face of the chassis.

Application Example 2

Figure 8:
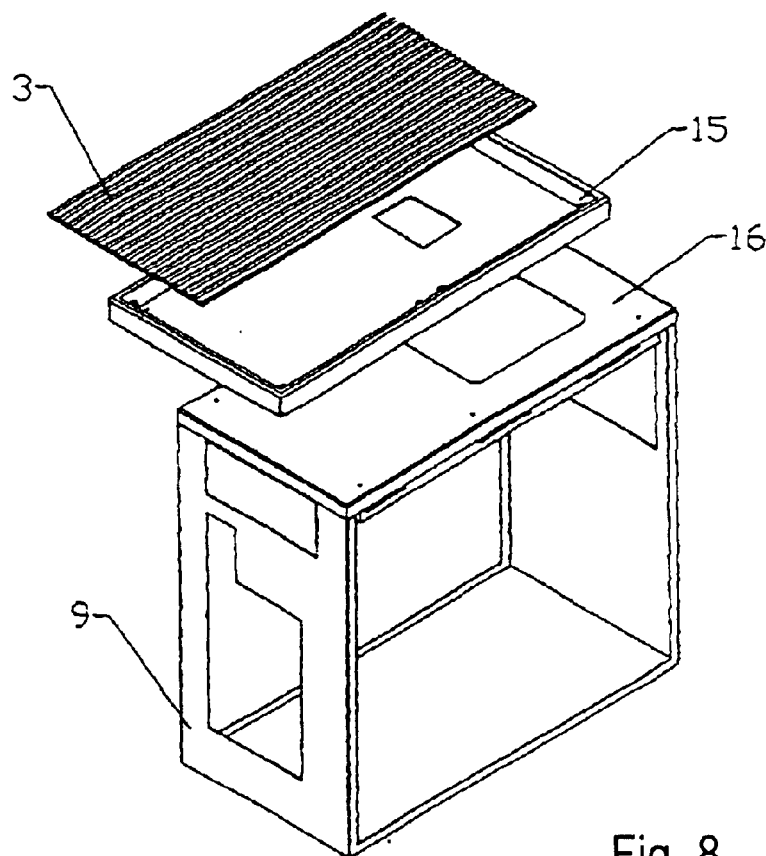
FIG. 8 is a structural drawing of the chassis used in Application Example 2.

FIG. 8 a structural drawing of the chassis used in Application Example 2. The fluid circulation system used in Application Example 2 is similar to that of Application Example 1, and its distinguishing characteristic consists in that, on the top face of the top panel (16) of the microcomputer chassis (9), there is additionally provided a heat-radiating plate mounting support (15), and, on the top face of the heat-radiating plate mounting support, there is provided a recess, with the heat transfer pipe (2) bonded to the bottom face of the heat-radiating plate (3) and attached, together with the heat-radiating plate, inside the recess of the heat-radiating plate mounting support. The heat transfer pipe (2) passes through the heat-radiating plate mounting support (15) and top panel (16) and is connected to the internal fluid circulation system of the microcomputer. The present application example provides improved mounting for the traditional microcomputer chassis.

Application Example 3

Figure 9:
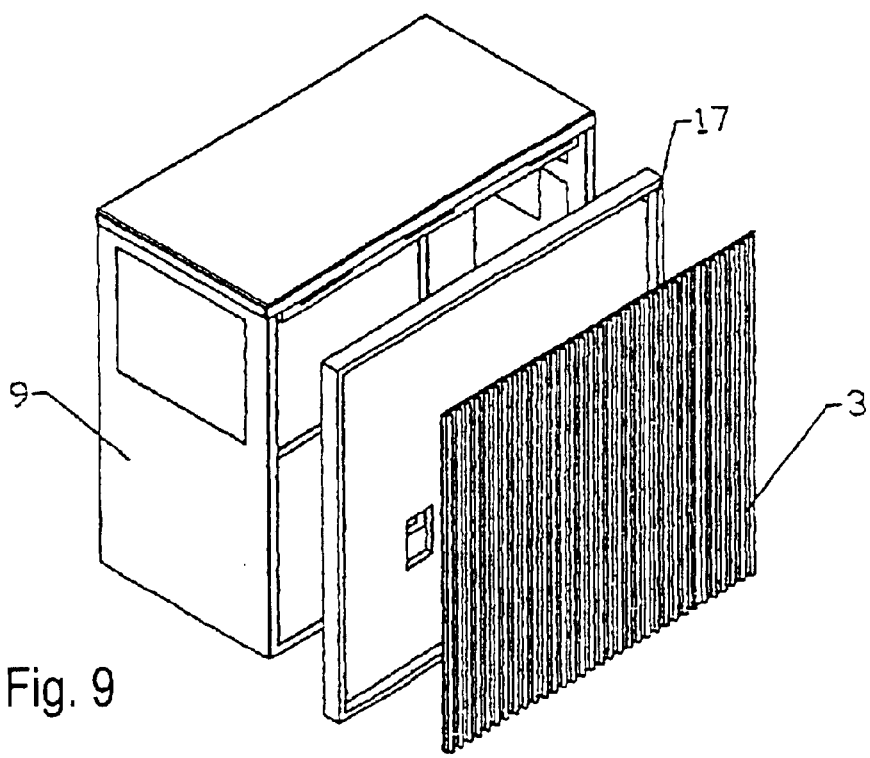
FIG. 9 is a structural drawing of the chassis used in Application Example 3.

FIG. 9 a structural drawing of the chassis used in Application Example 3. The fluid circulation system used in the present application example is similar to that of Application Example 1 and its distinguishing characteristic consists in that, on the side face of the microcomputer chassis, there is additionally provided a heat-radiating plate mounting support (17), and, on the outer surface of the heat-radiating plate mounting support, there is provided a recess, with the heat transfer pipe (2) bonded to the bottom face of the heat-radiating plate (3) and attached, together with the heat-radiating plate, inside the recess of the heat-radiating plate mounting support. The heat transfer pipe passes through the heat-radiating plate mounting support (17) and the chassis and is connected to the internal fluid circulation system of the microcomputer. The heat-radiating plate (3) can have a relatively large surface area, which is suitable for microcomputers with high power consumption, for example, for use in workstations.

Application Example 4

The present application example comprises a circulation-based heat dissipation system contained inside the microcomputer chassis and a power supply heat dissipation system disposed on the outer wall surface of the microcomputer chassis. A schematic drawing of the circulation-based heat dissipation system in FIG. 1 shows that it consists of heat-absorbing units (5, 7), a heat transfer pipe (2), a heat-radiating plate (3), a fluid feed pump (1), a fluid feed pipe (8), pipe connectors (4), a multi-way pipe connector (6), and heat transfer fluid.

At the fluid inlet and outlet ends of the heat-absorbing units (5, 7), heat transfer pipe (2), and fluid feed pump (1), there are installed pipe connectors (4), and a closed fluid path is formed by means of their serial connection. The heat transfer pipe (2) is a serpentine metal pipe bonded to the heat-radiating plate (3) and filled with heat transfer fluid. The heat transfer fluid, set in motion by the fluid feed pump (1), transfers heat absorbed by the heat-absorbing units (5, 7), which are bonded to the surface of the heat-generating components of the microcomputer, through the fluid feed pipe (8) via the metal heat transfer pipe (2) to the heat-radiating plate (3), from which the heat is dissipated to the surrounding air outside the microcomputer.

In the above-described circulation path, an arbitrary number of heat-absorbing units and heat transfer pipes can be serially connected in any given sequence to the fluid feed pump using the pipe connectors, and any number of heat-absorbing units can be connected in series or in parallel in any given sequence using the three-way connectors and pipe connectors.

Figure 10:
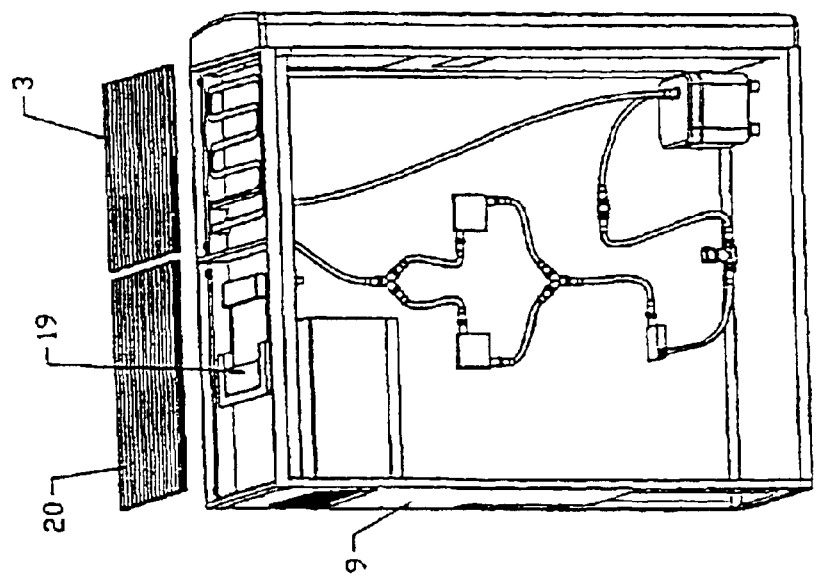
FIG. 10 is structural drawing of the chassis used in Application Example 4.

FIG. 10 is a structural drawing illustrating Application Example 4, wherein the external wall surface of a top panel located in the top portion of a microcomputer chassis (9) has two recesses, a front and rear recess, of which one is used to receive a heat transfer pipe (2) and a heat-radiating plate (3), and the other recess is used to receive a power supply heat dissipation system (19) and a power supply heat-radiating plate (20).

The bottom face of the outer casing of the fluid-circulating pump (1), via a shock-absorbing device, is integrally attached to the bottom face of the microcomputer chassis. The heat-absorbing units (5) are bonded to the heat-generating components inside the microcomputer.

Figure 11:
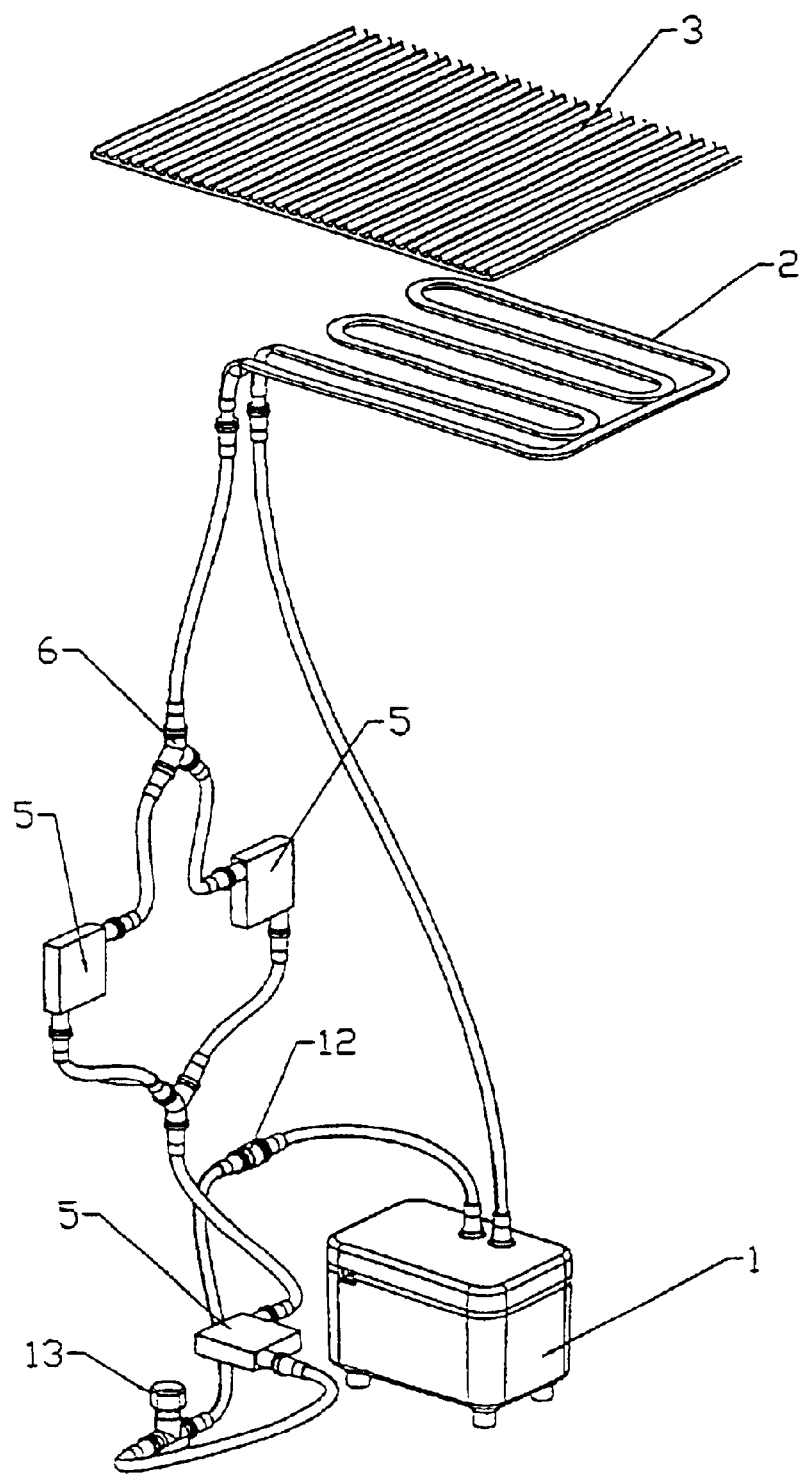
FIG. 11 is an enlarged structural drawing of the fluid circulation system used in Application Example 4.

FIG. 11 is a an enlarged view of the circulation system used in Application Example 4, wherein one outlet of the fluid feed pump (1) is sequentially connected to a supply fluid connector (12), a pressure equilibration tube (13), a multi-way pipe connector (6), heat-absorbing units (5), a three-way pipe connector (6), and then to a heat transfer pipe (2), and the other end of the heat transfer pipe (2) is connected to the other outlet of the fluid feed pump (1).

FIG. 4 illustrates the construction of the heat-absorbing unit (5), wherein two pipe connectors are disposed on the outer wall surface of a hollow cavity, in communication with the cavity, and said hollow cavity has at least one flat face, with said flat face used for bonding to the heat-generating components inside the microcomputer.

FIG. 5 illustrates the construction of the pressure equilibration tube, wherein a multi-way pipe fitting (13-1) has two pipe connectors, and, around the periphery of the other end thereof, has a matching thread for a cap (13-3) and a sealing gasket (13-2) provided to seal the end of the pipe.

FIG. 6 illustrates the construction of the supply fluid pipe connector, wherein the tube (14) is a tubular body, with two pipe connectors provided at both ends thereof FIG. 7 is a structural drawing of the shock-absorbing system of the fluid feed pump, wherein a pump main body (1-2) is combined with a lid (1—1) and an outer casing (1-4) though the medium of a shock-absorbing layer (1-3), with shock-absorbing feet (1-5) mounted on the bottom face of the outer casing (1-4) and integrally attached to the inner bottom face of the chassis.

Figure 12:
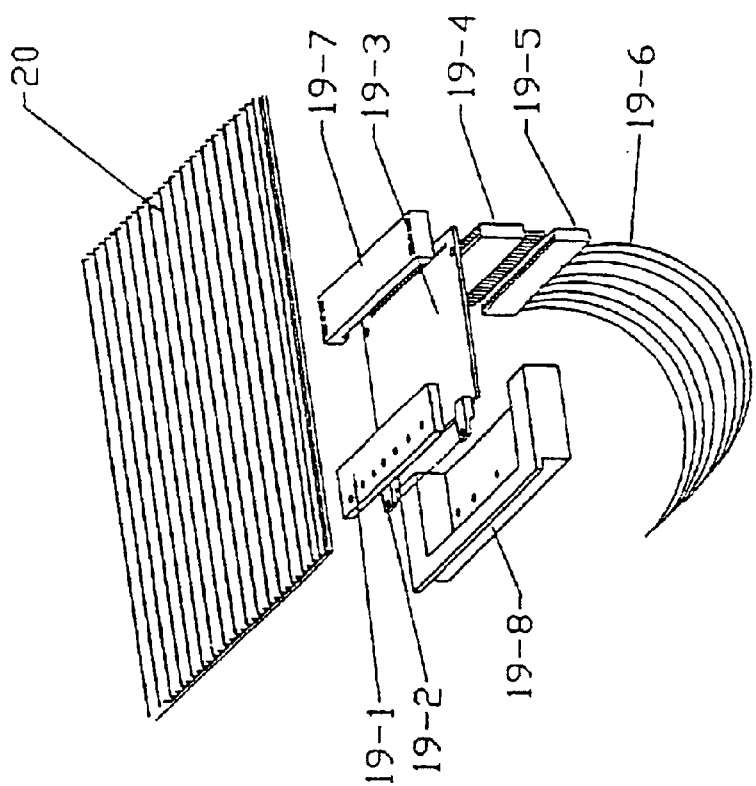
FIG. 12 is a structural drawing illustrating power supply heat dissipation in Application Example 4.

FIG. 12 is a structural drawing illustrating the power supply heat dissipation system in Application Example 4, wherein the heat-generating surfaces of the high-power transistors (19-2) of the power supply unit are bonded to one of the faces of a heat-conducting device such as a metal heat transfer plate (19-1), with the other face of the heat transfer plate (19-1) bonded to the bottom face of the power supply heat-radiating plate (20). The bases of the high-power transistors (19-2) are soldered to a circuit board (19-3). One side of the circuit printed on the circuit board (19-3) is connected to the bases of the high-power transistors and the other side is connected to a connector socket (19-4) soldered to the circuit board (19-3), and then, via a connector plug (19-5) and a wire belt (19-6) attached to the plug (19-5), is further connected to the location where the high-power transistors (19-2) are soldered to the circuit board (19-3) of the power supply unit.

The above-mentioned power supply heat-radiating plate is made of metal and has a smooth flat face on one side and parallel heat-dissipating ribs on the other side. A circuit board mounting support (19-7) and a bridge-shaped pressure plate (19-8) are used to mount and secure the power supply heat dissipation system.

The face-to-face coupling of the metal heat transfer plate (19-1) to the power supply heat-radiating plate (20) allows the heat of the high-power transistors to be efficiently conducted to the power supply heat-radiating plate and dissipated in the air outside the microcomputer, thereby replacing the fan used for the power supply unit.

Application Example 5

Figure 13:
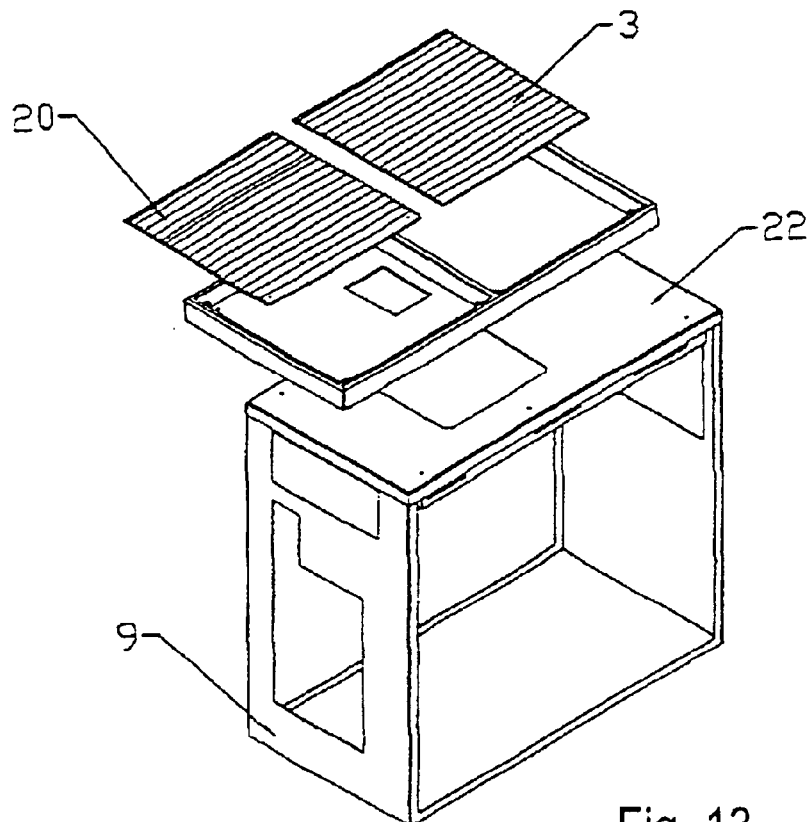
FIG. 13 is a structural drawing of the chassis used in Application Example 5.

FIG. 13 is a structural drawing of the chassis used in Application Example 5. The power supply heat dissipation system and circulation-based heat dissipation system used in Application Example 5 is similar to that of Application Example 4, and its distinguishing characteristic consists in that, on the top face of the top panel (21) of the microcomputer chassis, there is additionally provided a heat-radiating plate mounting support (22), and, on the top face of the heat-radiating plate mounting support, there are provided two recesses, a front and rear recess, with the heat transfer pipe (2) bonded to the bottom face of the heat-radiating plate (3) and attached, together with the heat-radiating plate, inside one of the recesses of the heat-radiating plate mounting support (22). The heat transfer pipe passes through the heat-radiating plate mounting support (22) and the top panel (21) and is connected to the internal fluid circulation system of the microcomputer. The power supply heat dissipation system (19) is attached to the power supply heat-radiating plate, and is mounted in the other recess of the heat-radiating plate mounting support (22); the plug-in end of the power supply heat dissipation system passes through the heat-radiating plate mounting support and the top panel (21) and is linked by a wire belt to the microcomputer's power supply unit. The present application example provides improved mounting for the traditional microcomputer chassis.

Application Example 6

Figure 14:
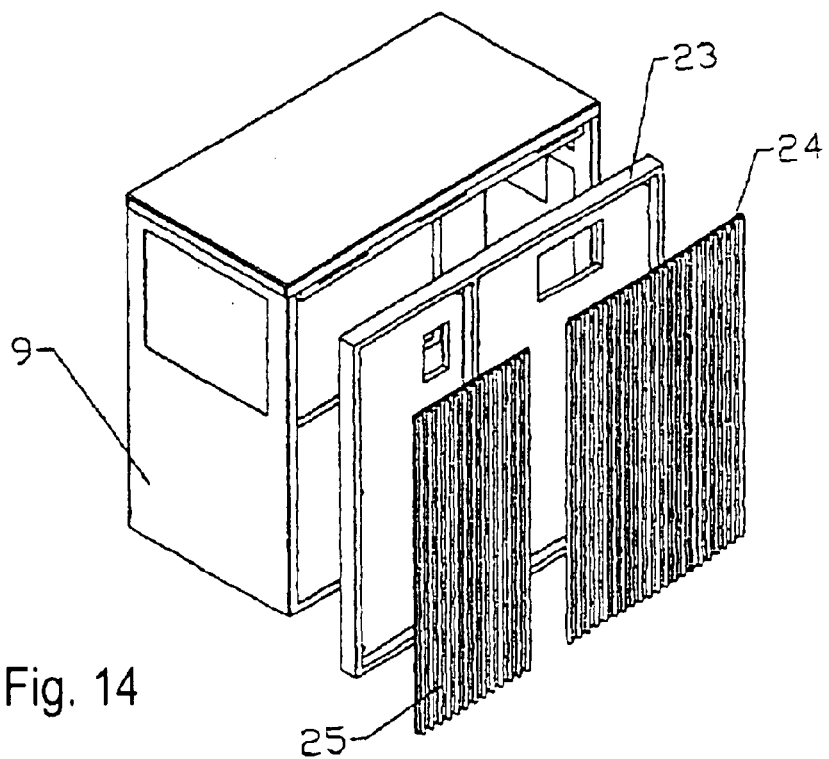
FIG. 14 is a structural drawing of the chassis used in Application Example 6.

FIG. 14 is a structural drawing of the chassis used in Application Example 6. The power supply heat dissipation system and circulation-based heat dissipation system used in Application Example 6 is similar to that of Application Example 5, and its distinguishing characteristic consists in that, on the side face of the microcomputer chassis, there is additionally provided a heat-radiating plate mounting support (23), and, on the outer surface of the heat-radiating plate mounting support, there are provided two recesses, one of which is used to receive the heat transfer pipe (2). The heat transfer pipe (2) is bonded to the rear side of the heat-radiating plate (25) and is attached, together with the heat-radiating plate, inside the recess of the heat-radiating plate mounting support. The heat transfer pipe passes through the heat-radiating plate mounting support (23) and the chassis and is connected to the internal fluid circulation system of the microcomputer. The power supply heat dissipation system (19) is attached to the power supply heat-radiating plate and is mounted in the other recess of the heat-radiating plate mounting support (23); the plug-in end of the power supply heat dissipation system (19) passes through the heat-radiating plate mounting support and is linked by a wire belt to the microcomputer's power supply unit. The heat-radiating plates (24, 25) can have a relatively large surface area, which is suitable for microcomputers with high power consumption, for example, for use in workstations.

The above-described heat-radiating plates are made of metal, and have a smooth flat face on one side and parallel heat-dissipating ribs on the other side.

While the specific embodiments have been illustrated and described, numerous modifications come to mind without significantly departing from the spirit of the invention, and the scope of protection is only limited by the scope of the accompanying claims.

What is claimed is:

1. A microcomputer heat dissipation system comprising heat-absorbing units, said heat-absorbing units being bonded to heat-generating electrical components inside the microcomputer and disposed in communication with a fluid circulating unit, and, to said fluid circulating unit, there is serially connected at least a heat-radiating pipe bonded to a heat-radiating plate, with said heat-radiating plate disposed on an outer wall surface of a chassis.

2. The microcomputer heat dissipation system as set forth in claim 1, which is characterized by the fact that the fluid circulating unit includes at least one pump, with fluid circulation in the fluid circulating unit provided by said pump.

3. The microcomputer heat dissipation system as set forth in claim 2, which is characterized by the fact that the pump of the above-mentioned fluid circulation system is securely attached inside the chassis and has a shock-absorbent connection to the chassis.

4. The microcomputer heat dissipation system as set forth in claim 1, which is characterized by the fact that the above-mentioned heat-absorbing units are constructed as a sealed hollow cavity provided with an inlet and an outlet for fluid, with said sealed cavity furnished with at least one heat-absorbing face, said heat-absorbing face being bondable to the heat-generating components.

5. The microcomputer heat dissipation system as set forth in claim 1, which is characterized by the fact that a plurality of heat-absorbing units are disposed in communication with the fluid circulating unit via parallel connection.

6. The microcomputer heat dissipation system as set forth in claim 1, which is characterized by the fact that a plurality of heat-absorbing units are disposed in communication with the fluid circulating unit via serial connection.

7. The microcomputer heat dissipation system as set forth in claim 1, which is characterized by the fact that a plurality of heat-absorbing units are disposed in communication with the fluid circulating unit simultaneously via serial and parallel connection.

8. The microcomputer heat dissipation system as set forth in claim 1, which is characterized by the fact that there is at least one heat-radiating plate disposed on the outer wall surface of the chassis, and said heat-radiating plate is disposed a top wall or a side wall of the chassis.

9. The microcomputer heat dissipation system as set forth in claim 8, which is characterized by the fact that the heat-radiating plate can be attached to the chassis through the medium of a mounting support having a recess, with the heat-radiating pipe passing through the wall of the chassis and bonded to the heat-radiating plate.

10. The microcomputer heat dissipation system as set forth in claim 8, which is characterized by the fact that a heat-dissipating structure may be provided on the outer wall surface of the above-mentioned chassis, thereby forming a heat dissipating plate.

11. A microcomputer heat dissipation system comprising a power supply heat dissipation system and a circulation-based heat dissipation system inside a microcomputer chassis, which is characterized by the fact that in a power supply heat-absorbing unit, high-power transistors of a power supply unit are connected to a heat-radiating plate via a heat-conducting device by means of planar contact, and that the above-mentioned circulation-based heat dissipation system is made up of heat-absorbing units bondable to heat-generating electrical components and said heat-absorbing units are in communication with a fluid circulating unit, and, to said fluid circulating unit, there can be serially connected at least a heat-radiating pipe bonded to the heat-radiating plate, with said heat-radiating plate disposed on an outer wall surface of the chassis.

12. The microcomputer heat dissipation system as set forth in claim 11, which is characterized by the fact that heat-generating surfaces of the high-power transistors are bonded to a heat-conducting device, said heat-conducting device preferably being a heat-conducting metal plate, with bonding to the above-mentioned heat-radiating plate carried out via the metal heat-conducting plate.

13. The microcomputer heat dissipation system as set forth in claim 12, which is characterized by the fact that the high-power transistors are connected to a power supply unit circuit via a circuit board.

14. The microcomputer heat dissipation system as set forth in claim 13, which is characterized by the fact the circuit board is connected via a circuit, to a connector socket, said socket being solderable to the circuit board, and a plug end, which is connected to the socket, is connected by a wire belt to the location where the high-power transistors are soldered to the power supply circuit board.

15. The microcomputer heat dissipation system as set forth in claim 12, which is characterized by the fact that said heat-conducting device is coupled to the heat-radiating plate using a pressure plate device.

16. The microcomputer heat dissipation system as set forth in claim 11, which is characterized by the fact that the high-power transistors are connected to a power supply unit circuit via a circuit board.

17. The microcomputer heat dissipation system as set forth in claim 16, which is characterized by the fact that said circuit board is connected, via a circuit, to a connector socket, said socket being solderable to the circuit board, and a plug end, which is connected to the socket, is connected by a wire belt to the location where the high-power transistors are soldered to the power supply circuit board.

18. The microcomputer heat dissipation system as set forth in claim 11, which is characterized by the fact that said heat-conducting device is coupled to the heat-radiating plate using a pressure plate device.

19. The microcomputer heat dissipation system as set forth in claim 11, which is characterized by the fact that the fluid circulating unit connected to the heat-absorbing units includes at least one fluid feed pump.

20. The microcomputer heat dissipation system as set forth in claim 19, which is characterized by the fact that the fluid feed pump has a shock-absorbing device.

21. The microcomputer heat dissipation system as set forth in claim 19, which is characterized by the fact that the fluid feed pump can be enclosed in a shock-absorbing casing and said casing can have at least two layers, with a shock-absorbing structure provided between the two layers of the casing; and, in the bottom portion of the casing, there may be provided shock-absorbing supports, with said shock-absorbing supports attached to the bottom of the chassis.

22. The microcomputer heat dissipation system as set forth in claim 11, which is characterized by the fact that the heat-absorbing units can be designed as a sealed hollow cavity provided with an inlet and an outlet for fluid, with said sealed cavity provided with at least one heat-absorbing face, said heat-absorbing face being securely bondable to the heat-generating components.

23. The microcomputer heat dissipation system as set forth claim 11, which is characterized by the fact that a plurality of heat-absorbing units are disposed in communication with the above-mentioned fluid circulating unit by means of a parallel connection.

24. The microcomputer heat dissipation system as set forth claim 11, which is characterized by the fact that a plurality of heat-absorbing units can be disposed in communication with the fluid circulating unit via serial connection.

25. The microcomputer heat dissipation system as set forth in claim 11, which is characterized by the fact that a plurality of heat-absorbing units is disposed in communication with the above-mentioned fluid circulating unit simultaneously via serial connection and parallel connection.

26. The microcomputer heat dissipation system as set forth in claim 11, which is characterized by the fact that the heat-radiating pipe is a metal heat-radiating pipe, with said heat-radiating pipe bonded to a heat-radiating plate disposed on the outer wall surface of the chassis.

27. The microcomputer heat dissipation system as set forth in claim 11, which is characterized by the fact that there is at least one or more heat-radiating plates and said heat-radiating plate(s) are attached to the outer wall surface of the microcomputer chassis by means of a mounting support, with a recess provided on an outside portion of said mounting support.

28. The microcomputer heat dissipation system as set forth claim 11, which is characterized by the fact that the above-mentioned heat-radiating pipe is bonded to the heat-radiating plate and is mounted in the recess of the mounting support.

29. The microcomputer heat dissipation system as set forth in claim 11, which is characterized by the fact that the heat-absorbing units are provided with a hollow cavity as well as with an inlet and an outlet for fluid connected by means of connectors to the hollow cavity, with said heat-absorbing units having a heat-absorbing plate on at least one face thereof.

30. The microcomputer heat dissipation system as set forth in claim 11, which is characterized by the fact that the outer wall surface of the above-mentioned chassis can be made up of a mounting support and a heat-radiating plate, with the above-mentioned heat-radiating plate disposed on the outside of said mounting support.

31. The microcomputer heat dissipation system as set forth in claim 30, which is characterized by the fact that the mounting support has a recess, with the above-mentioned heat-radiating pipe or heat-conducting device bonded to the heat-radiating plate and mounted in the recess of the mounting support.

32. The microcomputer heat dissipation system as set forth in claim 11, which is characterized by the fact that the mounting support has a recess, with the above-mentioned heat-radiating pipe or heat-conducting device bonded to the heat-radiating plate and mounted in the recess of the mounting support.

33. The microcomputer heat dissipation system as set forth in claim 11, which is characterized by the fact the heat-radiating plate can be fabricated by press-forming from metal, with heat-radiating ribs provided on its top face.

* * * * *